United States Patent
Norton et al.

(10) Patent No.: US 10,681,667 B2
(45) Date of Patent: Jun. 9, 2020

(54) METHOD AND SYSTEM FOR SERVICE VERIFICATION USING WIFI SIGNAL STRENGTH MAPPING

(71) Applicant: Tyco Fire & Security GmbH, Neuhausen am Rheinfall (CH)

(72) Inventors: Alexandra K. Norton, Duxbury, MA (US); Tyler H. Brown, New Haven, CT (US); Alessandro Scanu, Grange (IE)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 125 days.

(21) Appl. No.: 15/707,148

(22) Filed: Sep. 18, 2017

(65) Prior Publication Data
US 2019/0090215 A1    Mar. 21, 2019

(51) Int. Cl.
*H04W 64/00*      (2009.01)
*H04W 24/06*      (2009.01)
(Continued)

(52) U.S. Cl.
CPC .... *H04W 64/003* (2013.01); *G06Q 10/06311* (2013.01); *G06Q 10/103* (2013.01);
(Continued)

(58) Field of Classification Search
CPC .............. H04W 64/003; H04B 17/318; G06Q 10/06311
See application file for complete search history.

(56) References Cited

U.S. PATENT DOCUMENTS

| 6,150,936 A | 11/2000 | Addy |
| 7,633,392 B2 | 12/2009 | Neuwirth |

(Continued)

FOREIGN PATENT DOCUMENTS

WO    WO 2012130670    10/2012

OTHER PUBLICATIONS

European Search Report dated Mar. 1, 2019, from European Patent Application No. 18194955 filed Sep. 17, 2018. 9 pages.
(Continued)

*Primary Examiner* — Siming Liu
(74) *Attorney, Agent, or Firm* — HoustonHogle LLP (57) ABSTRACT

A service management system facilitates and validates service on building management systems. A service workflow module receives device events from control panels of the building management systems and combines them with local service data from mobile computing devices of technicians performing the service, generating service events. The service workflow module receives ambient radiofrequency (RF) signal data detected from the location of serviced devices. A validation module stores the ambient RF signal data and generates and a device fingerprint based on the ambient RF signal data. After device fingerprints based on the ambient RF signal data have been accumulated, the validation module determines whether current service events and ambient RF signal data are coherent with the device fingerprints and previous ambient RF signal data. The service workflow module also infers the location of the technician based on the ambient RF signal data and sends navigation information to the mobile computing device.

16 Claims, 4 Drawing Sheets

(51) Int. Cl.

| | | |
|---|---|---|
| *H04B 17/318* | (2015.01) | |
| *G08B 29/14* | (2006.01) | |
| *G06Q 50/16* | (2012.01) | |
| *G06Q 10/10* | (2012.01) | |
| *G06Q 10/00* | (2012.01) | |
| *G06Q 10/06* | (2012.01) | |
| *G01S 19/14* | (2010.01) | |
| *H04W 84/12* | (2009.01) | |
| *H04W 4/80* | (2018.01) | |

(52) U.S. Cl.
CPC ........... *G06Q 10/20* (2013.01); *G06Q 50/163* (2013.01); *G08B 29/14* (2013.01); *G08B 29/145* (2013.01); *H04B 17/318* (2015.01); *H04W 24/06* (2013.01); *G01S 19/14* (2013.01); *H04W 4/80* (2018.02); *H04W 84/12* (2013.01)

(56) References Cited

U.S. PATENT DOCUMENTS

| 9,900,115 | B2 | 2/2018 | Rauworth et al. |
|---|---|---|---|
| 2004/0217857 | A1 | 11/2004 | Lennartz et al. |
| 2007/0055760 | A1 | 3/2007 | McCoy et al. |
| 2007/0232288 | A1 | 10/2007 | McFarland et al. |
| 2008/0084291 | A1 | 4/2008 | Campion et al. |
| 2008/0218330 | A1 | 9/2008 | Biles et al. |
| 2009/0256699 | A1 | 10/2009 | Huseth et al. |
| 2012/0259583 | A1 | 10/2012 | Noboa et al. |
| 2013/0169681 | A1 | 7/2013 | Rasane et al. |
| 2013/0308674 | A1 | 11/2013 | Kramer et al. |
| 2014/0119674 | A1 | 5/2014 | Das et al. |
| 2014/0218164 | A1 | 8/2014 | Mahapatra et al. |
| 2014/0292348 | A1 | 10/2014 | Kanne et al. |
| 2015/0051749 | A1 | 2/2015 | Hancock et al. |
| 2015/0142491 | A1 | 5/2015 | Webb |
| 2015/0260541 | A1 | 9/2015 | Smith |
| 2015/0261229 | A1 | 9/2015 | Roy |
| 2015/0262114 | A1 | 9/2015 | Ming |
| 2015/0308704 | A1 | 10/2015 | Jung et al. |
| 2015/0312696 | A1 | 10/2015 | Ribbich et al. |
| 2015/0316907 | A1 | 11/2015 | Elbsat et al. |
| 2015/0327010 | A1 | 11/2015 | Gottschalk et al. |
| 2016/0187127 | A1 | 6/2016 | Purohit et al. |
| 2016/0327293 | A1* | 11/2016 | Grabowski ............... F24F 11/30 |
| 2017/0011312 | A1 | 1/2017 | Subramanian et al. |
| 2017/0074536 | A1 | 3/2017 | Bentz et al. |
| 2017/0090441 | A1 | 3/2017 | Schmitt et al. |
| 2017/0188188 | A1 | 6/2017 | Kang |
| 2017/0213303 | A1 | 7/2017 | Papadopoulos et al. |
| 2018/0279067 | A1 | 9/2018 | Ivanov et al. |
| 2019/0325368 | A1 | 10/2019 | Turney et al. |

OTHER PUBLICATIONS

European Search Report dated Feb. 28, 2019 for European Patent Application No. 18194954.6 filed Sep. 17, 2018. 10 pages.
Partial European Search Report, dated Feb. 15, 2019, from European Application No. 18195315.9, filed on Sep. 18, 2018. 12 pages.
European Search Report, dated May 22, 2019, from European Application No. 18195315.9, filed on Sep. 18, 2018. 10 pages.
European Search Report, dated Mar. 6, 2019, from European Patent Application No. 18194956.1, filed on Sep. 17, 2018. 9 pages.
European Search Report, dated Mar. 4, 2019, from European Patent Application No. 18194957.9, filed on Sep. 17, 2018. 10 pages.
European Search Report, dated Feb. 20, 2019, from European Application No. 18194953.8, filed on Sep. 17, 2018. 8 pages.

* cited by examiner

METHOD AND SYSTEM FOR SERVICE VERIFICATION USING WIFI SIGNAL STRENGTH MAPPING

RELATED APPLICATIONS

This application is related to:

U.S. application Ser. No. 15/707,135 filed on Sep. 18, 2017, entitled "Method and Apparatus for Cloud Based Predictive Service Scheduling and Evaluation." now U.S. Patent Publication No.: 2019-0086877 A1;

U.S. application Ser. No. 15/707,142 filed on Sep. 18, 2017, entitled "Method and System for Service Verification Using Access Control System," now U.S. Patent Publication No.: 2019-0089703 A1;

U.S. application Ser. No. 15/707,154 filed on Sep. 18, 2017, entitled "Method and Apparatus for Mapping Devices by Using Posted Maps," now U.S. Patent Publication No.: 2019-0087078 A1;

U.S. application Ser. No. 15/707,161 filed on Sep. 18, 2017, entitled "Method and Apparatus for Verifying Service of installed Devices Using RFID," now U.S. Patent Publication No.: 2019-0088109 A1; and U.S. application Ser. No. 15/707,167 filed on Sep. 18, 2017, entitled "Method and Apparatus for Evaluation of Temperature Sensors," now U.S. Patent Publication No.: 2019-0086881 A1.

All of the afore-mentioned applications are incorporated herein by this reference in their entirety.

BACKGROUND OF THE INVENTION

Building management systems such as building automation systems, fire alarm systems and intrusion systems are often installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Fire alarm systems typically include fire control panels that function as system controllers. Fire detection/initiation devices and alarm notification devices are then installed, distributed throughout the buildings and connected to the panels. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade.

Intrusion systems typically include intrusion panels and their own distributed devices. The distributed monitoring devices detect indications of intrusions, building security breaches and unauthorized access at or within the building and report to the intrusion panels. Examples of monitoring devices include motion sensor devices, door and window relays, thermal sensors, and surveillance camera devices that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples.

Building management systems require service, including installation, repair, testing, inspection, and compliance testing. When the systems are initially installed, the panels are typically located in a secure part of the building. Then, the distributed devices are installed throughout the building. The panels and the distributed devices must then be interconnected. Wired systems are often used. Although, in some cases wireless links are used to provide interconnection. Then later in the lifecycle, repair may be required. Sensor-type distributed devices can be damaged. They can also become dirty. Inspection and compliance testing is also mandatory for many types of building management systems. Fire alarm systems must be tested typically on a yearly basis, for example.

Recently, it has been proposed to use connected services systems to monitor fire alarm systems. Connected services systems are remote systems that communicate with the building management systems and are sometimes administered by separate business entities than the owners and/or occupants of the buildings, which contain the building managements systems. For example, the connected services system can be administered by a building management system manufacturer and/or an entity providing service on the building management systems.

Often during service, the connected services systems communicate with the control panel of a fire alarm system and mobile computing devices operated by on-site technicians. This has allowed the control panels to report status information, including devices events from distributed devices connected to the panels, to the connected services systems. Similarly, this has allowed the mobile computing devices, via mobile applications, to display information about the fire alarm systems, receive local service data, including inspection results, service narrative information and/or service completion status for different distributed devices, and send the local service data to the connected services system. By facilitating communication between the control panels and mobile computing devices, and by collecting and storing device events and local service data, connected services systems have been used to facilitate service on fire alarm systems.

For example, typically, the fire alarm devices are periodically tested by technicians (e.g., monthly, quarterly, or annually depending on fire or building codes) to verify that the distributed devices are physically sound, unaltered, working properly, not obstructed, properly labeled, and located in their assigned locations.

This testing of the distributed devices is often accomplished with a walkthrough test. During an inspection, the connected services system receives device events from the control panel, which originated from the distributed device sand local service data from a mobile computing device, including inspection results. Illustrated by way of example, upon activation of a fire alarm device, the control panel receives a signal from the activated device. Event data are generated and sent to the connected services system. The event data are stored and/or logged by the connected services system and also sent to the mobile computing device in real-time. The on-site technician is able to view the event data and verify that the fire alarm device is physically sound, unaltered, working properly, and in its assigned location. The mobile computing device then sends local service data including inspection results to the connected services system, and the technician moves to test the next fire alarm device.

Typically, these buildings are equipped with wireless access points for providing wireless connectivity between computing devices and a local area or enterprise network. Some buildings will have wireless access points for several different networks, administered by different entities. Wireless access points function by broadcasting and receiving radiofrequency (RF) signals to and from computing devices in the vicinity of the access point, and by acting as a relay between the computing devices and larger networks such as local area networks (LAN), enterprise networks and/or wide-area networks (WAN) such as the internet. The strength of the RF signals decreases as the distance between the wireless access point and the computing device increases. Additionally, wireless access points normally broadcast locally unique identifying information, such as a service set identifier, for example, to allow computing devices to detect, identify and connect to the wireless access points. Moreover, there may be other sources of RF signals in and around buildings including Bluetooth devices.

SUMMARY OF THE INVENTION

Certain types of service for building management systems are mandated by regulations. Entities can be audited by local regulatory bodies in order to verify that the services were completed. If the customer does not have such verification, their business could be impacted and the service can be required to be repeated and verified.

At the same time entities performing the service often want confirmation that the technician actually performed the service. Specifically, many types of service simply require the technician to observe the state of a device. That is, the technician determines whether the device has been damaged or covered over, is fully charged, and/or is located at its assigned position. The service entity at some level has to trust that the technician actually performed this job.

It is desirable to have a system that can verify that technicians providing service were in the area of the devices needing service and actually remained in that area for a period of time consistent with that generally required for designated service procedures, and record all relevant service details. This allows the service entity to audit the technicians work.

According to the present invention, detailed installation and service data for a building management system is sent to a connected services system. That data is collected with specificity regarding the type and location of device being serviced, such as installed, configured, tested or repaired, among other examples. After a sufficient amount of data is collected, an accurate model will have been generated, via a predictive analysis process, for predicting how long certain services take to perform.

By combining the features of the connected services systems with information from ambient RF signal data, which includes identification information of the wireless access points, for example, along with signal strength information, from wireless access points at the building where the service is being performed, it is possible to provide verification and documentation of that service. The ambient RF signal data can be used to prove that technicians were actually in the vicinity of the devices being serviced and also that the time that they spend in the area is consistent with the model generated by the predictive analysis code. The ambient RF signal data will be logged for future reference as further evidence that the work has actually been completed.

More particularly, the connected services systems would collect data related to the location of a technician (from a mobile computing device such as a cell phone that is normally carried or a specialized device that the installer is required to wear or carry during a service visit) during the time that they are performing services. The mobile computing device detects and relays ambient RF signal data from various wireless networks to the connected services system, which are then analyzed and compared to ambient RF signal data previously detected from the locations of devices that are being serviced or tested. For example, all of the fire extinguishers and smoke detectors in a building can be mapped by recording wireless signals from the WiFi networks that are in their vicinity, including the signal strength from each WiFi network as detected when a person is standing at the device. Therefore when service is provided later, and a technician records that they have serviced a device, the connected services system can verify that they are actually in the relative vicinity of the device. This becomes part of the official record that can be reproduced if the building and/or inspection are audited.

Additionally, ambient RF signal data can include relative differences in signal strength (rather than or in addition to the actual signal strength), such that, as wireless transmitters age they do not need to be re-mapped. This assumes that all transmitters age at approximately the same rate and that their signals degrade by a proportionate amount.

Another feature includes the ability to provide navigation information relevant to the service being performed in real time. The navigation can include information for nearby devices, location information and/or directions to the devices, and/or alerts that the mobile computing device is near the device, among other examples. For example, the connected services system can infer the location of the mobile computing device being used by the technician (or of an autonomous mobile computing device such as a robot performing service) based on the ambient RF signal data and send navigation information for the devices that require service to the mobile computing device. For example, a mobile application executing on the mobile computing device and communicating with the connected services system can also alert the technician when they are in the vicinity of a device requiring service. This is particularly useful if the device is not located in plain sight. In another example, a technician that is servicing one type of device (such as fire extinguishers) is alerted to the presence of other devices that are proximately located so that they can service the other devices while they are in the area rather than coming back to them at a later time.

As previously mentioned, this technique can also be used if testing is performed by an autonomous mobile computing device such as a robot. The autonomous mobile computing device would pass through the building on a routine schedule to service the devices. The robot can be generally guided by the navigation information based on the ambient RF signal data and then use other methods to more finely to locate and service the device.

In general, according to one aspect, the invention features a service management system for facilitating testing of a building management system. The service management system includes a service workflow module, a mobile computing device interface and a validation module. The service workflow module receives device events from the building management system and local service data from mobile computing devices and generates service events. The mobile computing device interface receives ambient radiofrequency signal data from the mobile computing devices. The validation module analyzes the service events from the service workflow module and the ambient radiofrequency signal data to validate the service on the building management system.

In embodiments, the validation module stores the ambient radiofrequency signal data from the mobile computing devices, for example, in a connected services database. The validation module determines whether the ambient radiofrequency signal data from the service is coherent with previously detected ambient radiofrequency signal data by comparing source identifiers (such as SSID's) for radio frequency signals and signal strength of those radio frequency signals. The ambient radiofrequency signal data includes data from detected WiFi signals, global navigation satellite system signals, Bluetooth signals, and so on. The service workflow module also generates inferred locations of the mobile computing devices based on the ambient radiofrequency signal data received from the mobile computing devices and sends alerts and navigation information to the mobile computing devices based on the inferred locations.

In general, according to another aspect, the invention features a method for facilitating testing of a building management system. Device events from the building management system and local service data from mobile computing devices are received, and service events are generated. In addition, ambient radiofrequency signal data from the mobile computing devices are received. The service events and the ambient radio frequency signal data are then analyzed to validate the service on the building management system.

In general, according to still another aspect, the invention features a system for testing of a building management system. The system includes mobile computing devices, which detect ambient radiofrequency signal data and a connected services system that utilizes the ambient radiofrequency signal data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
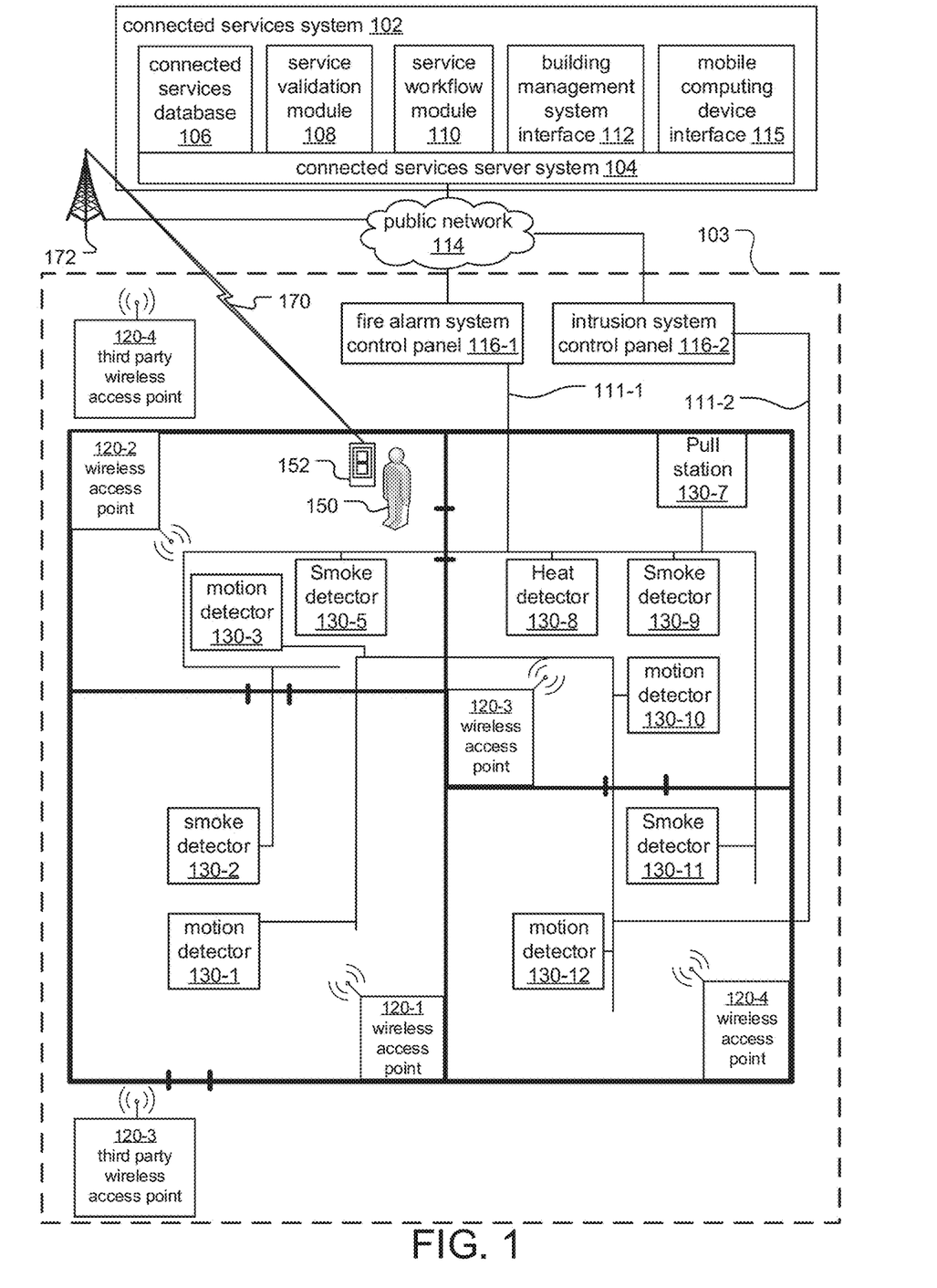
FIG. 1 is a schematic diagram of a service management system according to an embodiment of the current invention.

FIG. 1 is a schematic diagram of a service management system according to an embodiment of the current invention.

The service management system includes a connected services system 102, which, at a high level, communicates with building management systems installed within buildings 103 of various client entities, typically. Examples of client entities include residential, commercial, or governmental companies or agencies. Examples of the buildings include offices, hospitals, warehouses, retail establishments, shopping malls, schools, multi-unit dwellings, government buildings, or casinos, to list a few examples.

In general, the building management systems include control panels 116 and distributed devices 130. The control panels 116 direct the function of the respective building management system by determining and displaying the operational status of or sensor data from the distributed devices 130.

The distributed devices 130 are connected to their respective control panels 116 via safety and security wired and/or wireless networks 111 of the building 103. These networks 111 support data and/or analog communication between the distributed devices 130 and the respective control panels 116. In some embodiments (not illustrated), the distributed devices 130 could all be connected to the same safety and security network 111.

In the illustrated example, distributed devices 130 of the fire alarm system are connected to a fire alarm system control panel 116-1 via safety and security network 111-1 and are slave devices of the panel.

The distributed fire alarm devices 130 include alarm initiation devices including smoke detectors 130-2, 130-5, 130-9, 130-11, heat detectors 130-8 and manually activated devices such as pull stations 130-7. Alarm initiation devices can also include devices that are not depicted in the illustrated example, including call points and carbon monoxide detectors. The alarm initiation devices monitor the buildings for indicators of fire. Upon detection of indicators of fire, device signals are sent from the alarm initiating devices to the control panel. The device signals are typically alarm signals and/or analog values. The alarm signals are used to signal the control panel 116-1 that a fire has been detected. Alternatively, some devices provide analog values to indicate measured conditions. In one example, temperature sensors provide analog values for measured temperatures. In another example, smoke sensors provide analog values indicating smoke obscuration levels. The control panel 116-1 then determines if the analog values are indicative of a fire. Additionally, in some examples, the alarm initiation devices provide both alarm signals and analog values.

The distributed fire alarm devices 130 could further include fire notification devices (not illustrated), which notify occupants of the building 103 of a potential fire and generally include speakers, horns, bell, chimes, light emitting diode (LED) reader boards, and/or flashing lights (e.g., strobes), to list a few examples. In response to detection of indicators of fire, the fire alarm system control panel 116-1 initiates an alarm state, which activates the fire notification devices.

Similar to the fire alarm system, distributed devices 130 of the intrusion system are connected to an intrusion system control panel 116-2 via a second network 111-2.

The distributed intrusion devices 130 include devices for detecting the presence of unauthorized individuals in the building 103, including motion detectors 130-1, 130-3, 130-10, 130-12 and other devices (not illustrated) such as security cameras, door and window relays and network video recorders, among other examples. Upon detection of the presence of unauthorized individuals, device signals are sent from the motion detectors 130-1, 130-3, 130-10, 130-12 to the intrusion control panel 116-2.

The present system can be extended to other types of building management systems. For example in another implementation the panel is a building automation panel such as a panel that might control building climate including HVAC.

Typically, buildings 103 are equipped with wireless access points 120 for providing wireless connectivity between computing devices and a local area or enterprise network. Some buildings will have wireless access points 120 for several different networks, administered by different entities. Wireless access points 120 function by broadcasting and receiving radiofrequency (RF) signals to and from computing devices in the vicinity of the access point 120, and by acting as a relay between the computing devices and larger networks such as local area networks (LAN), enterprise networks and/or wide-area networks (WAN) such as the internet.

In the illustrated example, a technician 150 holding a mobile computing device 152 is also shown. The technician 150 is an individual performing service on the building management systems, including employees of entities occupying the building 103, property managers, building management system manufacturers and/or providers of service for building management systems.

The mobile computing device 152 presents information about the building management systems, receives local service data, including inspection results, service narrative information and/or service completion status for different devices, detects ambient RF signal data from wireless access points 120 and records signal strength information for the signals, and sends the local service data and ambient RF signal data and signal strength information to the connected services system 102. In the illustrated example, the mobile computing device 152 is a smartphone device. Alternatively, the mobile computing device 152 could be a laptop computer, tablet computer, phablet computer (i.e., a mobile device that is typically larger than a smart phone, but smaller than a tablet), smart watch, or specialized service and/or testing device to list a few examples. In an alternative embodiment (not illustrated), the mobile computing device 152 can be an autonomous mobile computing device such as a robot.

Each of the fire alarm system control panel 116-1, intrusion system control panel 116-2, and mobile computing device 152, are connected to the connected services system 102 via a leased data connection, private network and/or public network 114, such as the internet. In some cases, the control panels 116 have been given network connectivity to communicate with the connected services system 102; in other cases, testing computers connected to the control panels 116 function as gateways. The mobile computing device 152 connects to the public network 114 via a wireless communication link 170 to a cellular radio tower 172 of a mobile broadband or cellular network or public and/or private wired data networks such as an enterprise network, Wi-Max, or Wi-Fi network, for example.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers.

The connected services server system 104 executes a number of separate modules, including a service validation module 108 and a service workflow module 110. Each of these modules is associated with separate tasks. In some cases, these modules are discrete modules or they are combined with other modules into a unified code base. They can be running on the same server or different servers, virtualized server system or a distributed computing system.

The service workflow module 110 functions as an application server that communicates with the mobile computing device 152 operated by the technician 150. The service workflow module 110 provides the steps necessary for the technician 150 to service the building management system. The service workflow module 110 further receives the local service data provided by the technician 150 indicating that a particular panel 116 or distributed device 130 of the building management system has been serviced. This local service data may further include inspection results, narrative description from the technician describing the state of a particular panel 116 or distributed device 130 a description of its particular location, and/or notes concerning that panel or distributed device that might be useful for the next service. Further, the service workflow module 110 also receives device events from the particular panel 116 or distributed device 130 undergoing service and combines the device events with the local service data and then stores the resulting service events to a connected services database 106 in connection with the particular service being carried out on the building management system.

Additionally, the service workflow module 110 receives ambient radiofrequency (RF) signal data detected by and sent from the mobile computing device 152. The ambient RF signal data includes identification information of wireless transmitters along with signal strength information, including relative differences in signal strength (rather than or in addition to the actual signal strengths of wireless signals detected). Sources of the ambient RF signal data detected by the mobile computing device 152 include wireless access points 120 throughout the building 103, including third party wireless access points 120-4, which are owned by separate entities than the occupants of or owner of the building 103 and can even be located outside the building 103, Bluetooth and/or Bluetooth Low Energy (BLE) transmitters or beacons, and radiofrequency identification (ID) tags, among other examples. In examples, the ambient RF signal data originates from other mobile computing devices, wireless transmitters attached to or integral with distributed devices 130 and/or artificially distributed wireless transmitters. The mobile computing devices 152 detect the ambient RF signal data from the location of a distributed device 130 or control panel 116 being serviced and sends the ambient RF signal data to the service workflow module 110 associated with a device identification (ID) for the device that was serviced from the location from which the ambient RF signal data was detected.

Another source of ambient RF signals could be the distributed devices themselves. In some systems, the distributed devices communicate with their control panel via wireless links. Often, the devices are battery-operated and implement low power RF communication links. While the communication over these links is typically infrequent, in order to conserve power, RF communications can nevertheless be captured and recorded along with the device IDs that are typically incorporated in these broadcasts from the distributed devices.

In this way, the service workflow module 110 maintains "device RF fingerprints" for each distributed device 130 and control panel 116. The device fingerprint is an array of sources of ambient RF signal data, distinguished by identification information for the various sources of the signals (such as wireless access points 120), with signal strength information associated with the signals detected. The ambient RF signal data detected in the vicinity of each distributed device 130 and/or control panel 116 includes a unique combination of sources of wireless signals and signal strengths.

The service workflow module 110 also generates navigation information based on the ambient RF signal data. The navigation information can include device information for nearby devices, location information and/or directions to the devices to be displayed and/or interpreted by the mobile computing device 152, and/or alerts that the mobile computing device is near the device, among other examples. The service workflow module 110 infers the current location of the technician 150 based on the ambient RF signal data and pushes the navigation information and/or next device or devices to be serviced to the mobile computing device 152 to be indicated by a graphical user interface (GUI) of the mobile computing device 152 or to be used to navigate by an autonomous mobile computing device 152 such as a robot.

The connected services database 106 provides customer specific installation information to the service workflow module 110. In particular, the connected services database 106 includes lists of control panels 116 installed at various customer premises, the distributed devices 130 maintained by those panels, and historical test data associated with those panels and distributed devices.

The connected services system 102 also includes a building management system interface 112 and a mobile computing device interface 115.

The building management system interface 112 operates as the interface between the service workflow module 110 and the particular control panel 116 undergoing service. In particular, the building management system interface 112 converts instructions from the service workflow module 110 into instructions that are formatted into the protocol implemented by the particular panel. Additionally, the building management system interface 112 receives information such as device events from the current control panel 116 or distributed device 130 under service and converts those device events into a uniform format that can be consumed by the service workflow module 110, regardless of the underlying protocol implemented by the panels and distributed devices.

The mobile computing device interface 115 operates as an interface between the service workflow module 110 and mobile computing devices 152 used by technicians 150 performing the service. In particular, the mobile computing device interface 115 puts the ambient RF signal data into a uniform format that can be consumed by the service workflow module 110 and/or the service validation module 108.

The service validation module 108 communicates with the service workflow module 110 in order to validate service being performed on the building management system undergoing service. In particular, the service validation module 108 receives service events, including real time service information from the service workflow module 110 or possibly historical service information. Along with the service events, the service validation module 108 also receives ambient RF signal data and device IDs associated with the ambient RF signal data and stores this data for future use. In this way, the validation module 108 maintains an ambient RF signal data fingerprint based on previously detected ambient RF signal data for devices being serviced. The validation module 108 can further determine how long particular types of service will typically take based on how long the ambient RF signal data indicates the technician 150 was in the vicinity of the device being serviced. When enough ambient RF signal data has been received over time, the service validation module 108 further compares the service events, including the time at which the service events were generated, and the ambient RF signal data and device IDs, to the ambient RF signal data fingerprints for the same devices to ensure coherency.

Figure 2:
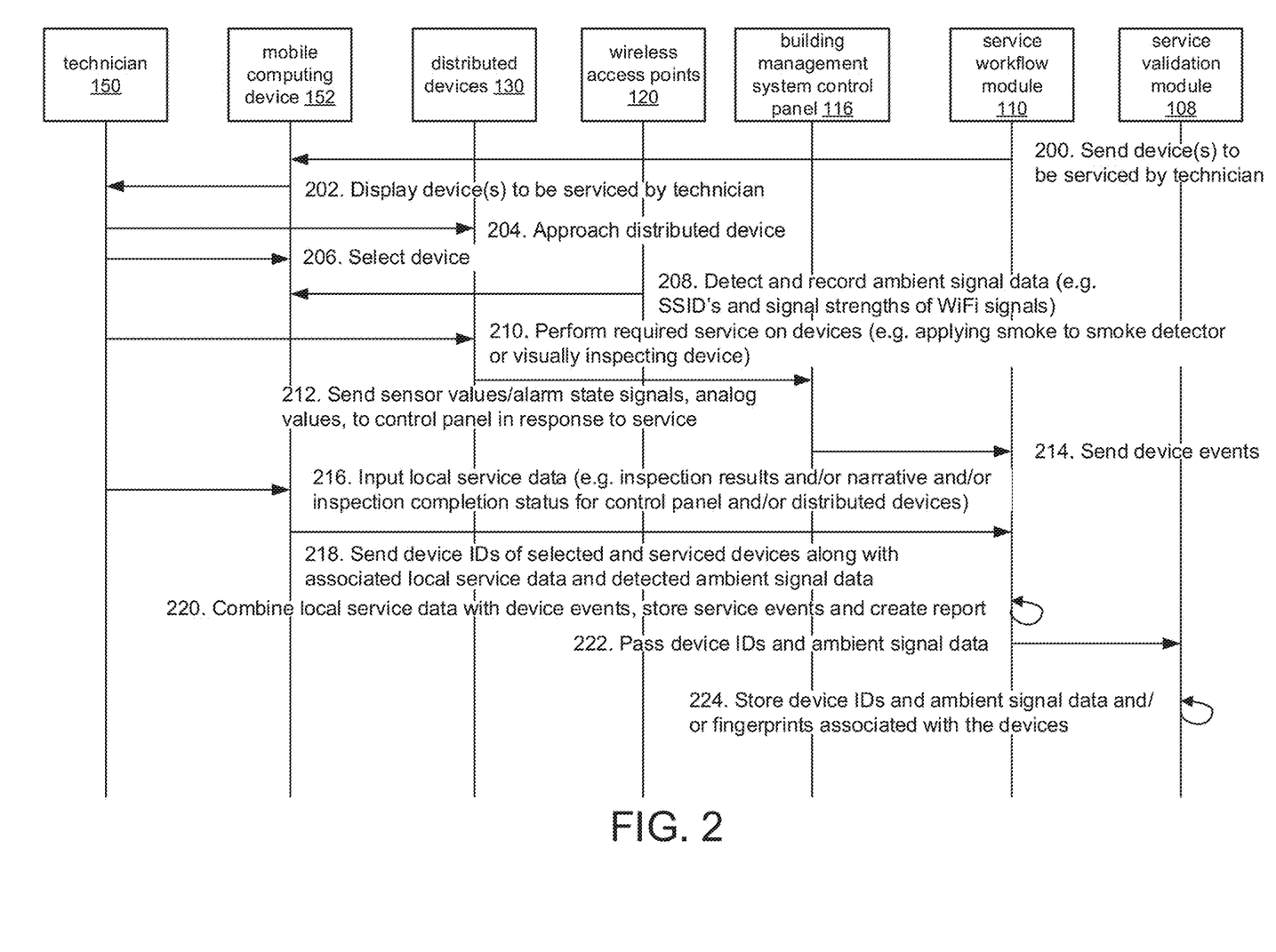
FIG. 2 is a sequence diagram illustrating the process by which the validation module accumulates ambient radiofrequency signal data during service on the building management system.

FIG. 2 is a sequence diagram illustrating the process by which the validation module 108 accumulates ambient RF signal data such as during service on the building management system.

In step 200, the service workflow module sends the distributed devices 130 and/or control panels 116 to be serviced to the mobile computing device 152, which displays them to the technician 150 in step 202.

In step 204, the technician 150 approaches a device and selects the device using the mobile computing device 152 in step 206. In the illustrated example, the technician 150 approaches a distributed device 130. However, in another example, the technician could approach and select a control panel 116.

In step 208, the mobile computing device detects and records the ambient RE signal data from the current location of the mobile computing device 150, which is assumed to be the location of the distributed device 130. The ambient RF signal data is detected and recorded for the duration of the service on the selected device and originates from wireless access points 120 and/or other wireless transmitters that are in the vicinity of the mobile computing device 152 at the time.

In step 210, the technician 150 performs the service, for example, by applying smoke to a smoke detector in order to test it.

In response, in step 212, the distributed device 130 sends sensor values/alarm state signals to the control panel 116, which generates device events (which can include the sensor values or alarm state signals and time information, for example) and sends the device events to the service workflow module 110 in step 214.

In step 216, the technician 150 also inputs local service data to the mobile computing device 152. The local service data, ambient RF signal data and associated device ID's for serviced devices are all sent from the mobile computing device 152 to the service workflow module 110 in step 218.

In step 220, the service workflow module 110 combines the local service data with the device events, resulting in service events, which are stored in the connected services database 106. A service report is also generated.

In step 222, the ambient RF signal data and device ID's are sent to the service validation module 108, where ambient RF signal data and/or device fingerprints based on the ambient RF signal data associated with the device ID's are stored in step 224.

Figure 3:
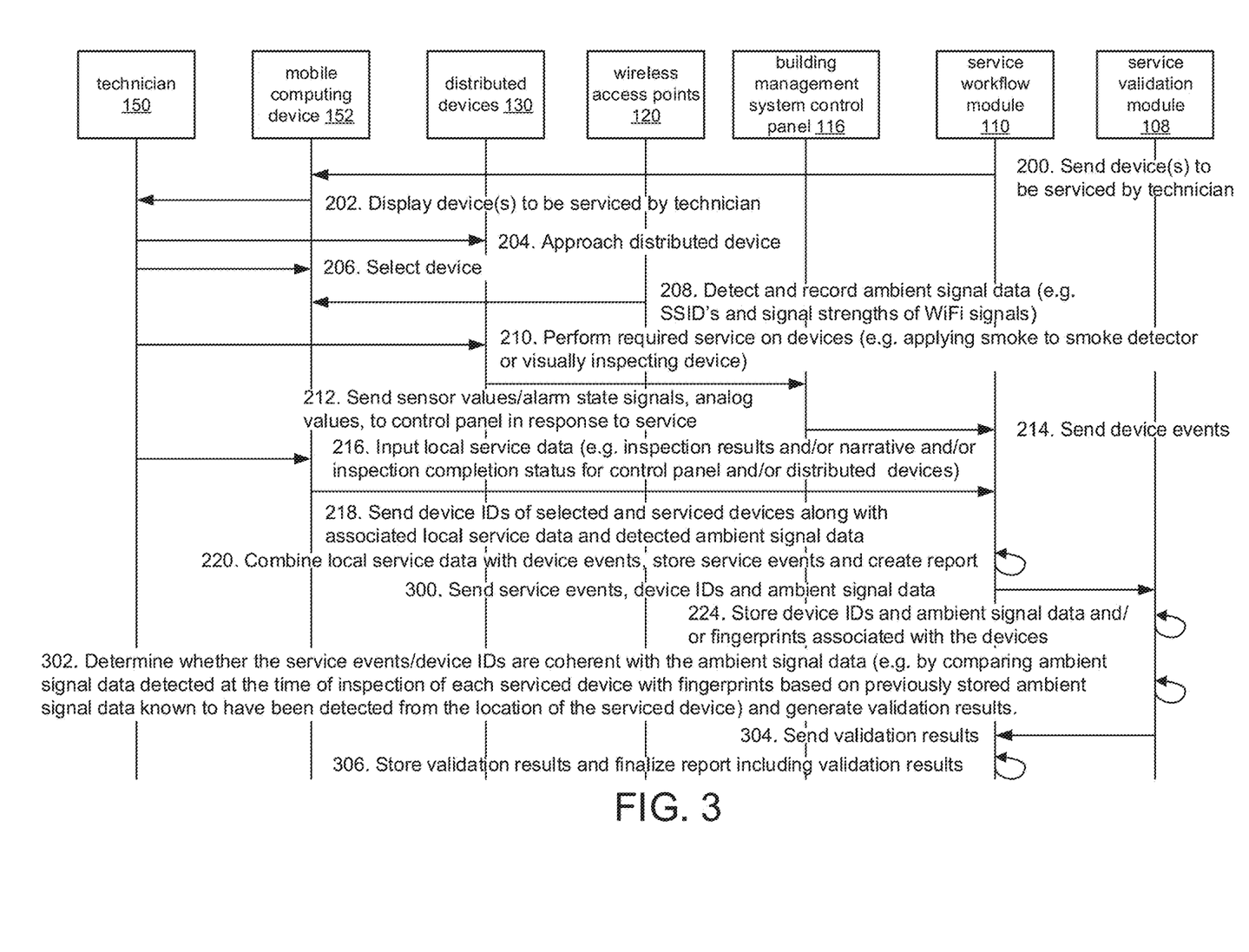
FIG. 3 is a sequence diagram illustrating the process by which the validation module validates service on the building management system.

FIG. 3 is a sequence diagram illustrating the process by which the validation module 108 validates service on the building management system.

Steps 200 through 220 proceed as previously described.

Now, however, in step 300, the service events are sent to the validation module 108 along with the ambient RF signal data and device ID's.

The ambient RF signal data and/or device fingerprints based on the ambient RF signal data associated with the device ID's are stored in step 224 as previously described.

In step 302, the service validation module 108 determines whether the service events, device ID's and ambient RF signal data are coherent, for example, by comparing the ambient RF signal data detected at the time of service of each distributed device 130 to the ambient RF signal data fingerprint based on the previously stored ambient RF signal data known to have been detected from the location of the distributed device 130, and by confirming that the duration of the service indicated by the ambient RF signal data matches the typical duration of service for that service type. Validation results are also generated.

In step 304, the service validation module 108 returns the validation results to the service workflow module 110, which stores them and finalizes the service report to include the validation results in step 306. The validation results and the finalized report are retained as evidence that the service was completed, for example, in the case of an audit.

Figure 4:
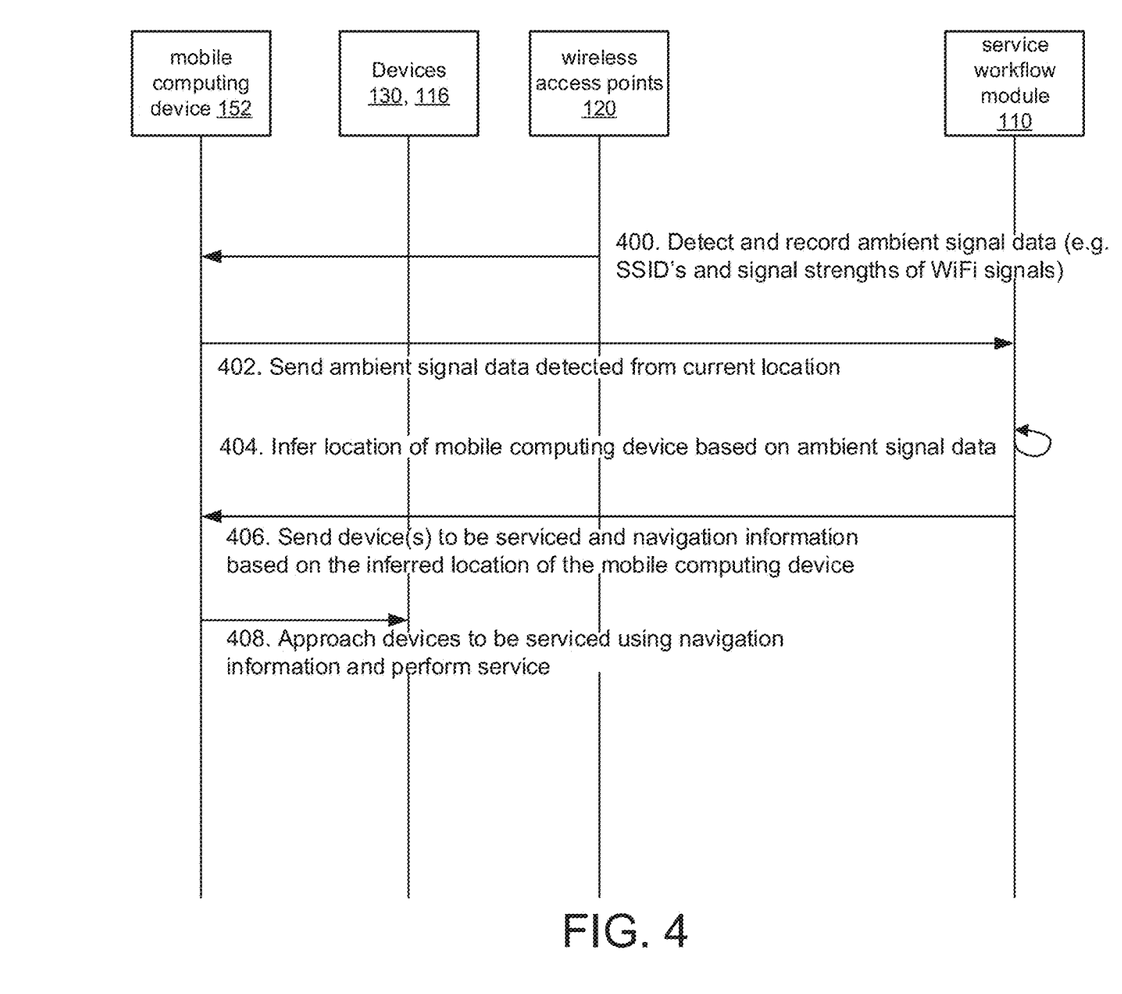
FIG. 4 is a sequence diagram illustrating the process by which the service workflow module provides navigation information to the mobile computing device.

FIG. 4 is a sequence diagram illustrating the process by which the service workflow module 110 provides navigation information to the mobile computing device 152.

In step 400, the mobile computing device 152, which can be a device operated by a technician 150 or an autonomous device such as a robot, detects and records ambient RF signal data, which is then sent to the service workflow module 110 in step 402.

In step 404, the service workflow module 110 infers the location of the mobile computing device 152 based on the ambient RF signal data. In one example, this can be done by comparing the ambient RF signal data to device fingerprints based on previously stored ambient RF signal data and using a known location of a matching device as a baseline to perform further calculations based on details of the ambient RF signal data received from the mobile computing device.

In step 406, devices requiring service and navigation information based on the inferred location of the mobile computing device 152 are returned.

In step 408, the mobile computing device 152 approaches the devices to be serviced using the navigation information, and the service is performed.

In one example, the navigation information is displayed by the mobile computing device 152 to the technician 150 carrying the mobile computing device 152, and the technician uses the navigation information to approach the next device to be serviced.

In another example, the mobile computing device 152 is an autonomous device such as a robot, and the navigation information is interpreted by the mobile computing device 152 which approaches the next device to be serviced independently.

In another example, the mobile computing device 152 alerts the technician 150 (e.g. by playing an alarm sound, vibrating, or displaying a message), when the technician 150 is inferred to be in the vicinity of a device requiring service.

In another example, the mobile computing device 152 alerts the technician 150 when the technician 150 is servicing one type of device (such as fire extinguishers), and there are devices of other types (such as smoke detectors or control panels) determined to be in the vicinity of the inferred location of the technician 150.

While this invention has been particularly shown and described with references to preferred embodiments thereof, it will be understood by those skilled in the art that various changes in form and details may be made therein without departing from the scope of the invention encompassed by the appended claims.

What is claimed is:

1. A service management system for facilitating testing of a building management system, comprising:
   a service workflow module for receiving device events from the building management system and local service data from mobile computing devices and generating service events;
   a mobile computing device interface for receiving ambient radiofrequency signal data from the mobile computing devices; and
   a validation module for analyzing the service events from the service workflow module and the ambient radiofrequency signal data to validate service on the building management system, wherein the validation module determines whether ambient radiofrequency signal data detected during the service is coherent with previously detected ambient radiofrequency signal data by comparing source identifiers for radio frequency signals and signal strength of those radio frequency signals.

2. The system as claimed in claim 1, wherein the validation module stores the ambient radiofrequency signal data from the mobile computing devices.

3. The system as claimed in claim 1, wherein the ambient radiofrequency signal data includes data from detected WiFi signals.

4. The system as claimed in claim 1, wherein the ambient radiofrequency signal data includes data from detected global navigation satellite system signals.

5. The system as claimed in claim 1, wherein the ambient radiofrequency signal data includes data from detected Bluetooth signals.

6. The system as claimed in claim 1, wherein the workflow module generates inferred locations of the mobile computing devices based on the ambient radiofrequency signal data received from the mobile computing devices.

7. The system as claimed in claim 6, wherein the workflow module sends alerts to the mobile computing devices based on the inferred locations.

8. The system as claimed in claim 6, wherein the workflow module sends navigation information to the mobile computing devices based on the inferred locations.

9. A method for facilitating testing of a building management system, comprising:
receiving device events from the building management system and local service data from mobile computing devices, and generating service events; and
receiving ambient radiofrequency signal data from the mobile computing devices and analyzing the service events and the ambient radio frequency signal data to validate service on the building management system; and
validating the service on the building management system by determining whether ambient radiofrequency signal data detected during the service is coherent with previously detected ambient radiofrequency signal data by comparing source identifiers for radio frequency signals and signal strength of those radio frequency signals.

10. The method as claimed in claim 9, further comprising storing the ambient radiofrequency signal data from the mobile computing devices.

11. The method as claimed in claim 9, wherein the ambient radiofrequency signal data includes data from detected WiFi signals.

12. The method as claimed in claim 9, wherein the ambient radiofrequency signal data includes data from detected global navigation satellite system signals.

13. The method as claimed in claim 9, wherein the ambient radiofrequency signal data includes data from detected Bluetooth signals.

14. The method as claimed in claim 9, further comprising generating inferred locations of the mobile computing devices based on the ambient radiofrequency signal data received from the mobile computing devices.

15. The method as claimed in claim 14, further comprising sending alerts to the mobile computing devices based on the inferred locations.

16. The method as claimed in claim 14, further comprising sending navigation information to the mobile computing devices based on the inferred locations.

* * * * *